United States Patent
Ji et al.

(10) Patent No.: US 12,013,983 B2
(45) Date of Patent: Jun. 18, 2024

(54) HAPTIC FEEDBACK METHOD, RELATED DEVICE AND COMPUTER READABLE STORAGE MEDIUM

(71) Applicant: GOERTEK INC., Shandong (CN)

(72) Inventors: Huiqing Ji, Shandong (CN); Anyang Cui, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/043,082

(22) PCT Filed: Dec. 5, 2020

(86) PCT No.: PCT/CN2020/134134
§ 371 (c)(1),
(2) Date: Feb. 27, 2023

(87) PCT Pub. No.: WO2022/041552
PCT Pub. Date: Mar. 3, 2022

(65) Prior Publication Data
US 2023/0305629 A1    Sep. 28, 2023

(30) Foreign Application Priority Data
Aug. 27, 2020  (CN) .......................... 202010881859.3

(51) Int. Cl.
*G06F 3/041*   (2006.01)
*G06F 3/01*    (2006.01)

(52) U.S. Cl.
CPC .................................. *G06F 3/016* (2013.01)

(58) Field of Classification Search
CPC ....................................................... G06F 3/016
USPC ........................................................ 345/173
See application file for complete search history.

(56) References Cited

U.S. PATENT DOCUMENTS

| | | | |
|---|---|---|---|
| 9,947,187 B2 | 4/2018 | Brown et al. | |
| 2015/0145656 A1* | 5/2015 | Levesque | G06F 1/163 340/407.1 |
| 2015/0341900 A1* | 11/2015 | Jeong | H04W 68/02 455/458 |

(Continued)

FOREIGN PATENT DOCUMENTS

| CN | 105406882 A | 3/2016 |
|---|---|---|
| CN | 107843250 A | 3/2018 |

(Continued)

OTHER PUBLICATIONS

International Search Report from International Application No. PCT/CN2020/134134 dated May 26, 2021.

*Primary Examiner* — Jonathan M Blancha
(74) *Attorney, Agent, or Firm* — Shih IP Law Group, PLLC (57) ABSTRACT

Disclosed is a haptic feedback method, a related device and a computer readable storage medium. The haptic feedback method is used in a wearable device, and the haptic feedback method includes: receiving first vibration information sent by a terminal device; on the basis of the first vibration information, sending vibration feedback information to the terminal device; receiving second vibration information sent by the terminal device; and on the basis of the first vibration information, implementing vibration. The present method aims to solve the problem in the prior art of the information sent by the wearable devices being limited.

10 Claims, 7 Drawing Sheets

(56) References Cited

U.S. PATENT DOCUMENTS

| | | | |
|---|---|---|---|
| 2015/0358201 A1* | 12/2015 | Park | H04M 19/04 715/735 |
| 2017/0010672 A1 | 1/2017 | Tanaka et al. | |
| 2017/0318381 A1 | 11/2017 | Noertker et al. | |
| 2018/0204426 A1 | 7/2018 | Nagisetty et al. | |
| 2019/0155388 A1* | 5/2019 | Lee | G06F 3/016 |
| 2019/0279472 A1 | 9/2019 | Ito et al. | |

FOREIGN PATENT DOCUMENTS

| | | | |
|---|---|---|---|
| CN | 108319361 A | 7/2018 |
| CN | 109445600 A | 3/2019 |
| CN | 109634428 A | 4/2019 |
| CN | 110083248 A | 8/2019 |
| CN | 111352509 A | 6/2020 |
| CN | 111949133 A | 11/2020 |

\* cited by examiner

HAPTIC FEEDBACK METHOD, RELATED DEVICE AND COMPUTER READABLE STORAGE MEDIUM

The present application claims a priority to a Chinese patent application with an Application No. 202010881859.3, titled "a haptic feedback method, a related device and a computer readable storage medium" filed in the China Patent Office on Aug. 27, 2020, and all the contents thereof are incorporated herein by reference.

TECHNICAL FIELD

The present application relates to a technical field of a wearable device, in particular to a haptic feedback method, a related device and a computer readable storage medium.

BACKGROUND ART

In the prior art, a method of outputting information by a wearable device is relatively simple, and generally, it is similar to a method of outputting information by other electronic devices, that is, outputting information to a user by a method of outputting images or audio. However, compared to other electronic devices, the wearable device is generally not convenient for the user to observe directly, so that the wearable device is only generally used as an information input device. When sending information to a user in a method of vibration by the wearable device, the vibration of the electronic device may only transmit effective information to the user due to the simpleness of vibration mod, so that the information might sent by the wearable device is limited. The above content is only used to assist understanding the technical solution of the present application, and does not mean that the above content is recognized as a prior art.

SUMMARY

The present application is directed to a haptic feedback method, a related device and a computer readable storage medium, which are intended to solve a problem of limited information sent by the wearable device in the prior art.

To achieve the above object, the present application provides a haptic feedback method, wherein the haptic feedback method is applied to a wearable device, and the haptic feedback method includes:
  receiving, by the wearable device, first vibration information sent by a terminal device;
  sending vibration feedback information to the terminal device according to the first vibration information;
  receiving second vibration information sent by the terminal device; and
  vibrating according to the second vibration information.
  Optionally, the first vibration information is the first vibration information sent to the wearable device when the terminal device detects a touch operation.
  Optionally, the haptic feedback method further includes: after receiving, by the wearable device, the first vibration information sent by the terminal device,
    obtaining vibration mode information of the terminal device; and
    if the vibration mode information of the terminal device is a first vibration mode, sending vibration feedback information to the terminal device according to the first vibration information.

Optionally, the haptic feedback method further includes: after obtaining the vibration mode information of the terminal device,
  if the vibration mode information of the terminal device is a second vibration mode, vibrating according to the first vibration information.
Optionally, obtaining the vibration mode information of the terminal device includes:
  obtaining device information of the terminal device; and
  determining the vibration mode information of the wearable device according to the device information.
In order to achieve the above object, the present application provides a haptic feedback method, which is applied to a wearable device, including:
  receiving, by the terminal device, touch operation of a user;
  sending first vibration information to a wearable device according to the touch operation;
  obtaining vibration feedback information sent by the wearable device;
  determining second vibration information according to the first vibration information and the vibration feedback information; and
  sending the second vibration information to the wearable device, so that the wearable device vibrates according to the second vibration information.
Optionally, the haptic feedback method further includes:
  sending vibration mode information to the wearable device, wherein when the vibration mode information is a first vibration mode, the wearable device vibrates according to the second vibration information, and when the vibration mode information is a second vibration mode, the wearable device vibrates according to the first vibration information.
Optionally, the vibration mode information includes device information of the terminal device.
In order to achieve the above object, the present application provides a wearable device, which includes a memory, a processor, and a haptic feedback program stored on the memory and operable by the processor, the haptic feedback program, when executed by the processor, implementing the haptic feedback method according to any one of the above embodiments.
In order to achieve the above object, the present application provides a terminal device, which includes a memory, a processor and a haptic feedback program stored on the memory and operable by the processor, the haptic feedback program, when executed by the processor, implementing the haptic feedback method according to any one of the above embodiments.
In order to achieve the above object, the present application provides a computer readable storage medium having a haptic feedback program stored thereon, the haptic feedback program, when executed by the processor, implementing the haptic feedback method according to any one of the above embodiments.

The present application provides a haptic feedback method, which includes: when receiving first vibration information sent by a terminal device, sending, by the wearable device, vibration feedback information to the terminal device according to the first vibration information; receiving second vibration information sent by the terminal device; and the wearable device vibrating according to the second vibration information. By vibration of the terminal device and the wearable device together, the user may determine the information sent by the terminal device according to the vibration of the terminal device and the vibration of the wearable device, to increase the diversity of the information sent by the electronic device, and thus to solve the problem of limited information sent by the wearable device in the prior art.

BRIEF DESCRIPTION OF THE DRAWINGS

In order to explain the technical solution in the embodiment of the present application or the prior art more clearly, the drawing needed to be used in the content of the embodiment or the prior art will be briefly introduced as following. Obviously, the drawing in the following content is only a part of the drawing of the present application. Other drawing may also be obtained according to the provided drawing without paying creative work for those ordinary skilled in the art.

DETAILED DESCRIPTION OF EMBODIMENTS

The technical solutions of embodiments of the present application will be described below in combination with the drawing of the embodiments of the present application. Obviously, the described embodiments are only a part of the embodiments of the present application, but not all of the embodiments of the present application. Based on the embodiments in the present application, all of other embodiments obtained without creative labor by those ordinary skilled in the art belong to the protection scope of the present application.

Figure 1:
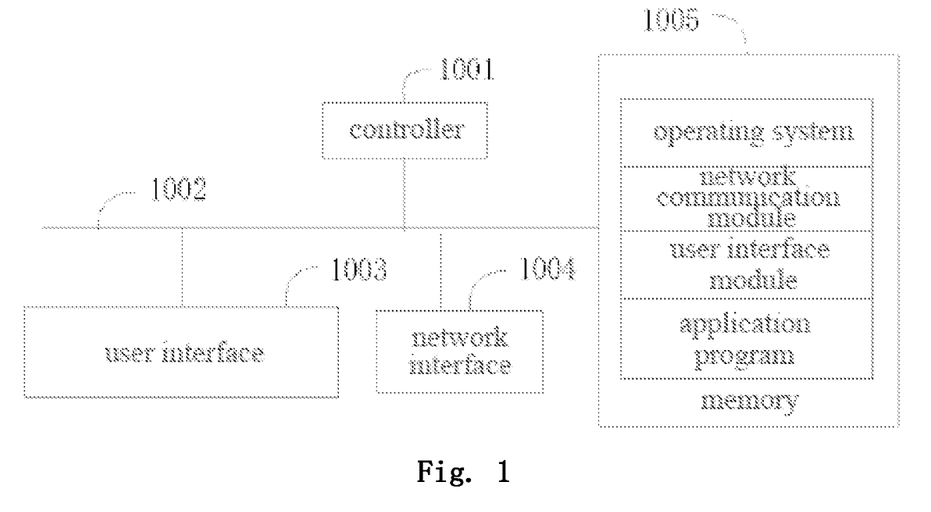
FIG. 1 is a schematic diagram of a structure of a terminal of a hardware operation environment according to a technical solution of an embodiment of the present application.

As shown in FIG. 1, FIG. 1 is a schematic diagram of a structure of a device of a hardware operation environment according to a technical solution of an embodiment of the application.

As shown in FIG. 1, the device may include: a controller 1001 such as CPU; a network interface 1004; a user interface 1003; a memory 1005; and a communication bus 1002. Here, the communication bus 1002 is used to achieve connection and communication between these components. The user interface 1003 may include a display; and an input unit such as a keyboard. Optionally, the user interface 1003 may also include a standard wired interface and a standard wireless interface. Optionally, the network interface 1004 may include a standard wired interface and a standard wireless interface (such as a WI-FI interface). The memory 1005 may be a high-speed RAM memory or a non-volatile memory such as a magnetic disk memory. Optionally, the memory 1005 may also be a storage device independent of the above controller 1001.

It may be understood by those ordinary skilled in the art that the structure of the device shown in FIG. 1 is not a limitation of the device, it may include more or fewer components than that shown in the FIG. 1, or some components may be combined, or it may have different component arrangements.

As shown in FIG. 1, the memory 1005 which is a computer storage medium may include an operating system, a network communication module, a user interface module and an application program.

In a server shown in FIG. 1, the network interface 1004 is mainly used to connect a background server and perform data communication with the background server, the user interface 1003 is mainly used to connect a client end (a user end) and perform data communication with the client end, and the controller 1001 may be used to call the application program stored in the memory 1005 and perform the following operations:

receiving, by a wearable device, first vibration information sent by a terminal device;

sending vibration feedback information to the terminal device according to the first vibration information;

receiving second vibration information sent by the terminal device; and vibrating according to the second vibration information.

Further, the controller 1001 may call the application program stored in the memory 1005 and also perform the following operations:

obtaining vibration mode information of the terminal device; and if the vibration mode information of the terminal device is a first vibration mode, sending vibration feedback information to the terminal device according to the first vibration information.

Further, the controller 1001 may call the application program stored in the memory 1005 and also perform the following operations:

if the vibration mode information of the terminal device is a second vibration mode, vibrating according to the first vibration information.

Further, the controller 1001 may call the application program stored in the memory 1005 and also perform the following operations:

obtaining device information of the terminal device; and determining the vibration mode information of the wearable device according to the device information.

Further, the controller 1001 may call the application program stored in the memory 1005 and also perform the following operations:

receiving, by the terminal device, touch operation of a user;

sending first vibration information to a wearable device according to the touch operation;

obtaining vibration feedback information sent by the wearable device;

determining second vibration information according to the first vibration information and the vibration feedback information; and sending the second vibration information to the wearable device, so that the wearable device vibrates according to the second vibration information.

Further, the controller 1001 may call the application program stored in the memory 1005 and also perform the following operations:

sending vibration mode information to the wearable device, wherein when the vibration mode information is a first vibration mode, the wearable device vibrates according to the second vibration information, and when the vibration mode information is a second vibration mode, the wearable device vibrates according to the first vibration information.

The application provides a haptic feedback method, a related device and a computer readable storage medium.

Embodiment 1

Figure 2:
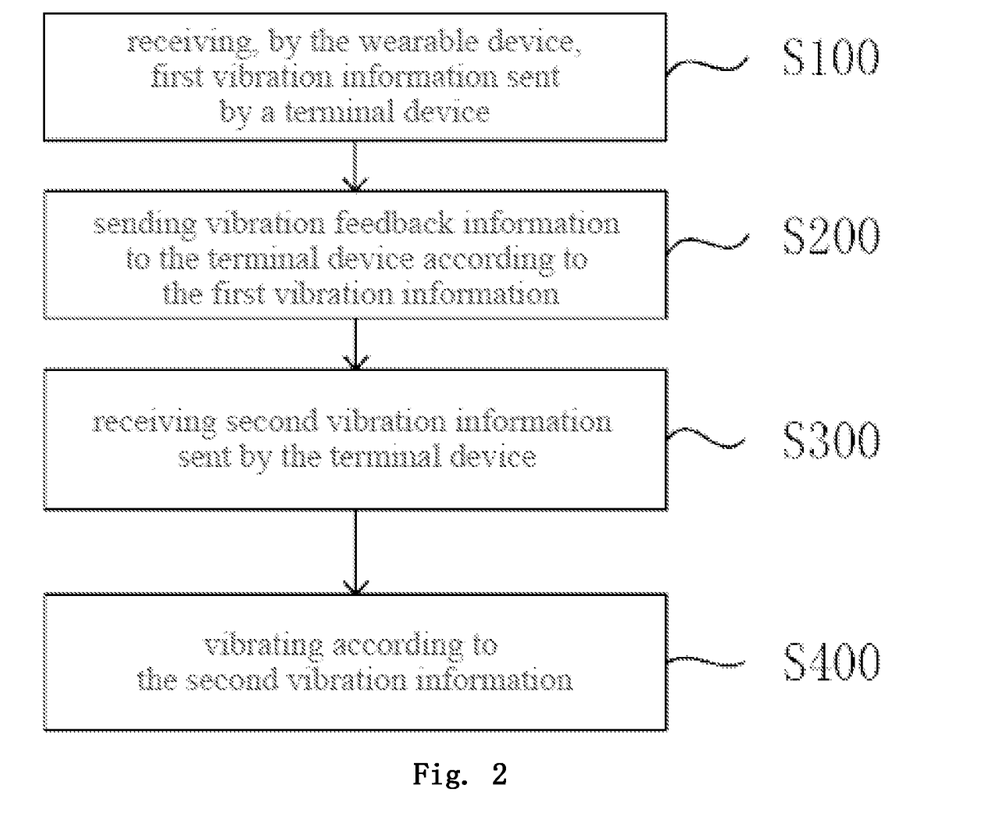
FIG. 2 is a flowchart of a first embodiment of a step counting method of the present application.

With reference to FIG. 2, the haptic feedback method is applied to a wearable device, the haptic feedback method includes:

S100, receiving, by the wearable device, first vibration information sent by a terminal device; and S200, sending vibration feedback information to the terminal device according to the first vibration information.

Here, the wearable device is an intelligent device worn by users. Specifically, the wearable device may be an intelligent ring or an intelligent bracelet. It may be understood that the wearable device may also be other intelligent wearable devices that might be worn by the users.

Here, the terminal device is a device used by users for touch operation. Specifically, the terminal device may be a mobile phone, a tablet computer or other devices that may facilitate to perform touch operation for the users.

In a preferred embodiment, when the terminal device detects a touch operation, it sends the first vibration information to the wearable device. In a specific embodiment, the first vibration information may include at least one of vibration time, vibration frequency or vibration duration. After receiving the first vibration information sent by the terminal device, the wearable device sends vibration feedback information to the terminal device according to the first vibration information. The vibration feedback information includes at least one of vibration position information or vibration time information.

It may be understood that the first vibration information may also be the vibration information sent by the terminal device to the wearable device in other scenarios. Specifically, the first vibration information may be the vibration information sent to the wearable device when the terminal device receives a message notification, and may also be the vibration information generated by the terminal device when detecting reminder information in the system software. Specifically, when the timing of a timer of the terminal device returns to zero, the terminal device sends the first vibration information to the wearable device to inform the user that the countdown time by the timer is up.

The method includes:

S300, receiving second vibration information sent by the terminal device; and S400, the wearable device vibrating according to the second vibration information.

Were, after sending the vibration feedback information to the terminal, the wearable device receives the second vibration information sent by the terminal device. Specifically, when the vibration feedback information includes vibration position information, the terminal device determines the second vibration information according to the vibration position information, and the vibration information includes vibration amplitude and vibration frequency. It may be understood that when the second vibration feedback information includes vibration time information, the terminal device determines the second vibration information according to the vibration position information, and the second vibration information includes vibration amplitude and vibration time. After receiving the second vibration information, the wearable device vibrates according to the second vibration information.

The present application provides a haptic feedback method, which includes: when receiving, by the wearable device, first vibration information sent by a terminal device, sending vibration feedback information to the terminal device according to the first vibration information, wherein when detecting a touch operation, the terminal device sends the first vibration information to the wearable device; obtaining second vibration information sent by the terminal device; and the wearable device vibrating according to the second vibration information. By vibration of the terminal device and the wearable device together, the user may determine the information sent by the terminal device according to the vibration of the terminal device and the vibration of the wearable device, to increase the diversity of the information sent by the electronic device, and thus to solve the problem of limited information sent by the wearable device in the prior art.

Embodiment 2

Figure 3:
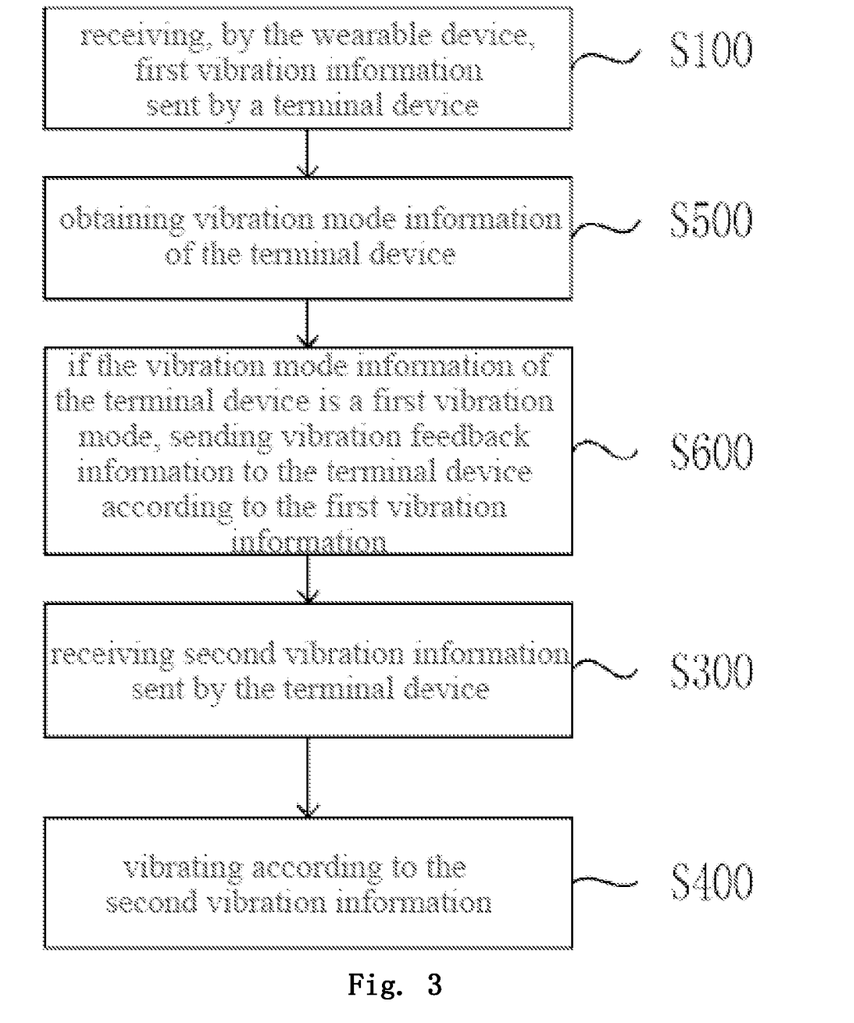
FIG. 3 is a flowchart of a second embodiment of a step counting method of the present application.

With reference to FIG. 3, the step S100 of Embodiment 1 also includes:

S500, obtaining vibration mode information of the terminal device; and

S600, if the vibration mode information of the terminal device is a first vibration mode, sending vibration feedback information to the terminal device according to the first vibration information.

Here, the vibration mode information includes a vibration allowable mode and a vibration non-allowable mode. Here, when the terminal device allows vibration, the vibration mode information sent by the terminal device to the wearable device is the first vibration mode. After detecting the first vibration mode, the wearable device determines that the terminal device allows vibration, and continues to execute the step of sending the vibration feedback information to the terminal device according to the first vibration information when receiving, by the wearable device, the first vibration information sent by the terminal device.

Embodiment 3

Figure 4:
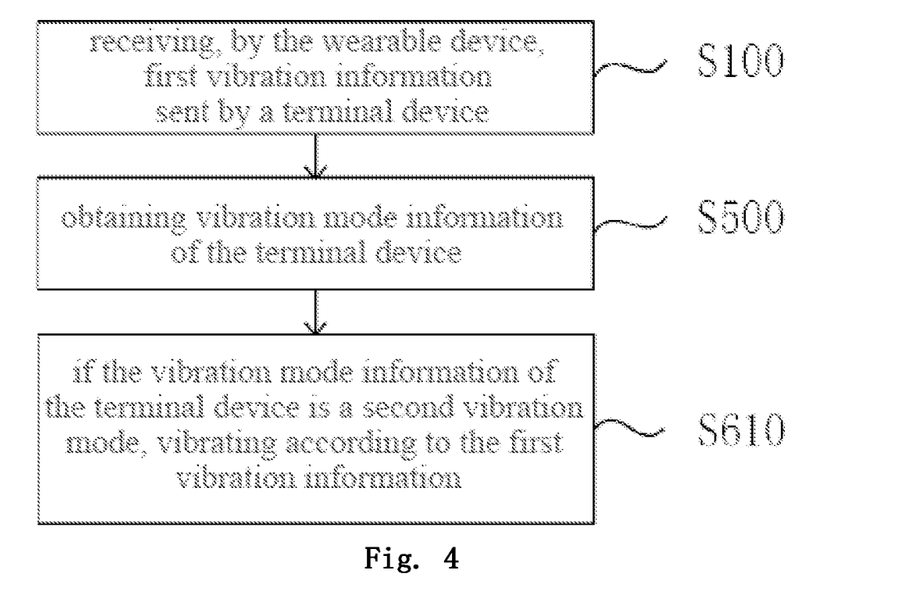
FIG. 4 is a flowchart of a third embodiment of a step counting method of the present application.

With reference to FIG. 4, after the step S500 in Embodiment 2, the method further includes:

S610, if the vibration mode information of the terminal device is a second vibration mode, vibrating according to the first vibration information.

Here, when the terminal device does not allow vibration, the vibration mode information sent by the terminal device to the wearable device is the second vibration mode. After detecting the second vibration mode, the wearable device determines that the terminal device does not allow vibration, and thus the wearable device vibrates directly according to the first vibration information.

Embodiment 4

Figure 5:
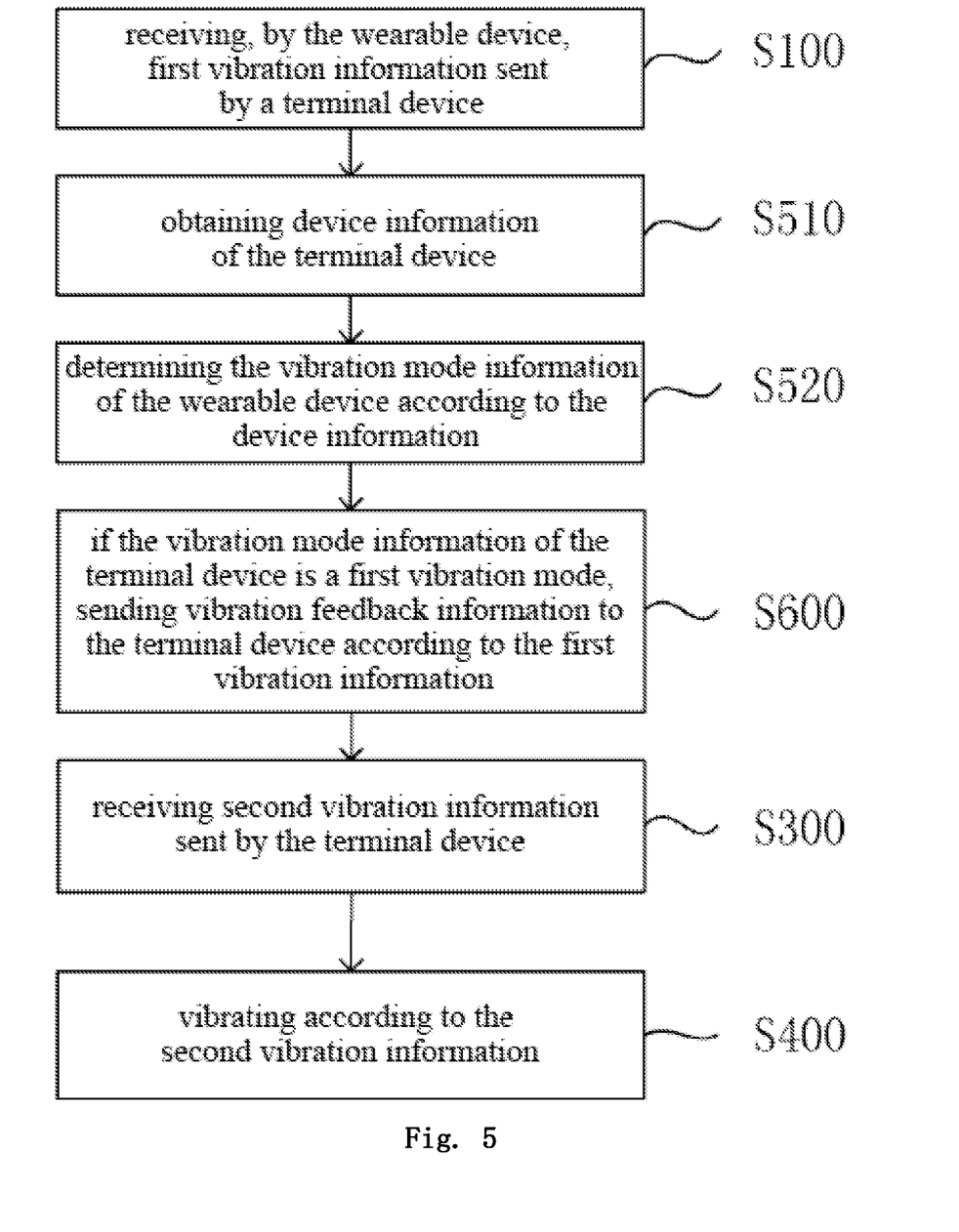
FIG. 5 is a flowchart of a fourth embodiment of a step counting method of the application.

With reference to FIG. 5, the step S500 in the Embodiment 2 includes:

S510, obtaining device information of the terminal device; and

S520, determining the vibration mode information of the wearable device according to the device information.

Here, the device information refers to hardware information of the terminal device. Specifically, when the terminal device allows vibration, the terminal device includes a vibration unit for vibration. When obtaining the device information of the terminal device, the wearable device searches whether the terminal device includes the vibration unit from the device information. When the terminal device includes the vibration unit, it is determined that the vibration mode information is a first vibration mode. When the terminal device does not include the vibration unit, it is determined that the vibration mode information is the second vibration mode.

Embodiment 5

Figure 6:
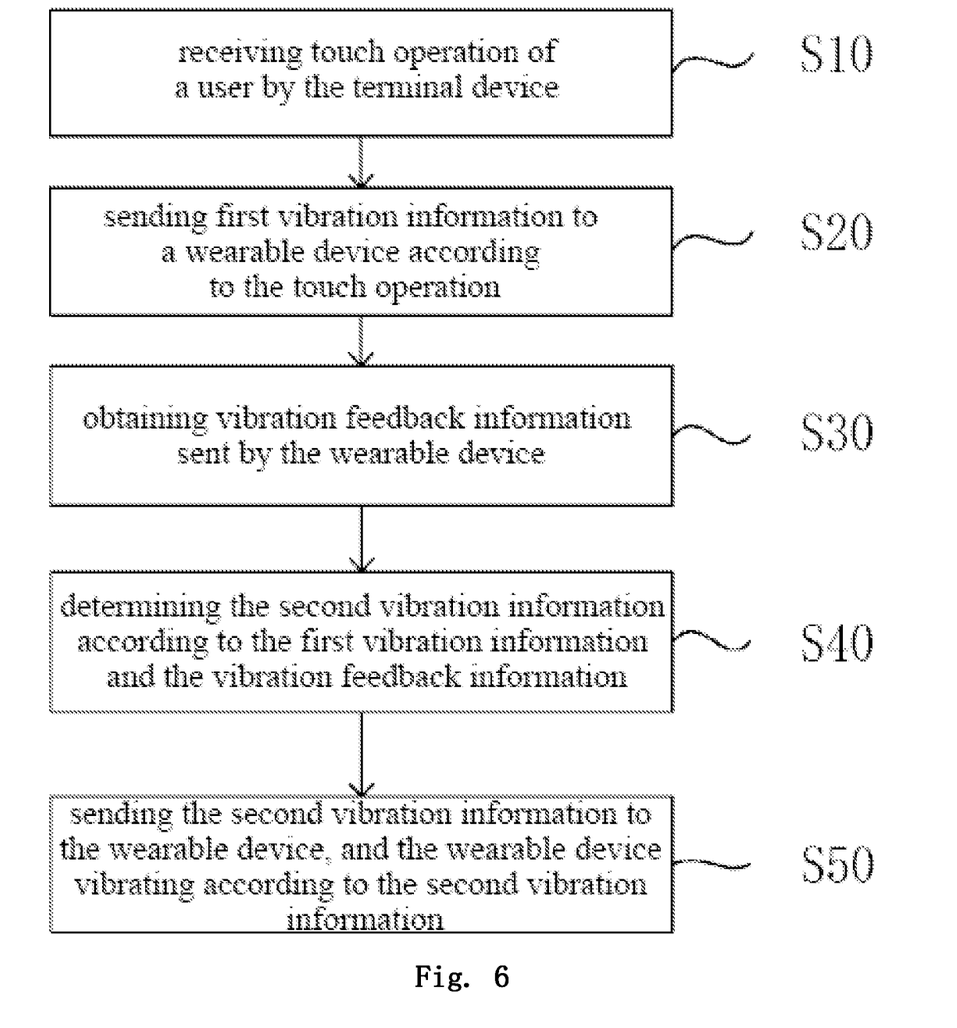
FIG. 6 is a flowchart of a fifth embodiment of a step counting method of the present application.

With reference to FIG. 6, in order to achieve the above object, the present application also provides a haptic feedback method. The haptic feedback method is applied to a terminal device, and the haptic feedback method includes:

S10, receiving touch operation of a user by the terminal device.

Here, the touch operation is the operation of the user touching the terminal device. In a specific embodiment, the terminal device includes a touch display screen, and the touch operation includes but is not limited to one of click operation, sliding operation, double click operation, multi finger click operation or multiple click operation.

The method includes:

S20, sending first vibration information to a wearable device according to the touch operation.

Here, when detecting the user's touch operation, the terminal device determines the first vibration information according to the touch operation. Specifically, the first vibration information may be determined according to different touch operations. In a specific embodiment, when the touch operation is a click operation, the terminal device may determine vibration times according to click numbers. When the touch operation is a press operation, the terminal may determine vibration amplitude and vibration duration according to the pressing pressure.

The method includes:

S30, vibration feedback information sent by the wearable device.

Here, after determining the first vibration information, the first vibration information is sent to the wearable device, and the vibration feedback information sent by the wearable device is obtained. Specifically, the first vibration information may include at least one of vibration time, vibration frequency and vibration duration. After receiving the first vibration information sent by the terminal device, the wearable device sends vibration feedback information to the terminal device according to the first vibration information. The vibration feedback information includes at least one of vibration position information and vibration time information.

The method includes:

S50, determining second vibration information according to the first vibration information and the vibration feedback information; and S60, sending the second vibration information to the wearable device, and the wearable device vibrating according to the second vibration information.

Here, after obtaining the vibration feedback information sent by the wearable device, the terminal device determines the second vibration information according to the first vibration information and the vibration feedback information. Specifically, the second vibration information includes vibration information for the vibration of the wearable device, and the second vibration information may include at least one of vibration amplitude, vibration duration, vibration delay or vibration frequency. After receiving the second vibration information, the wearable device vibrates according to the second vibration information.

Embodiment 6

Figure 7:
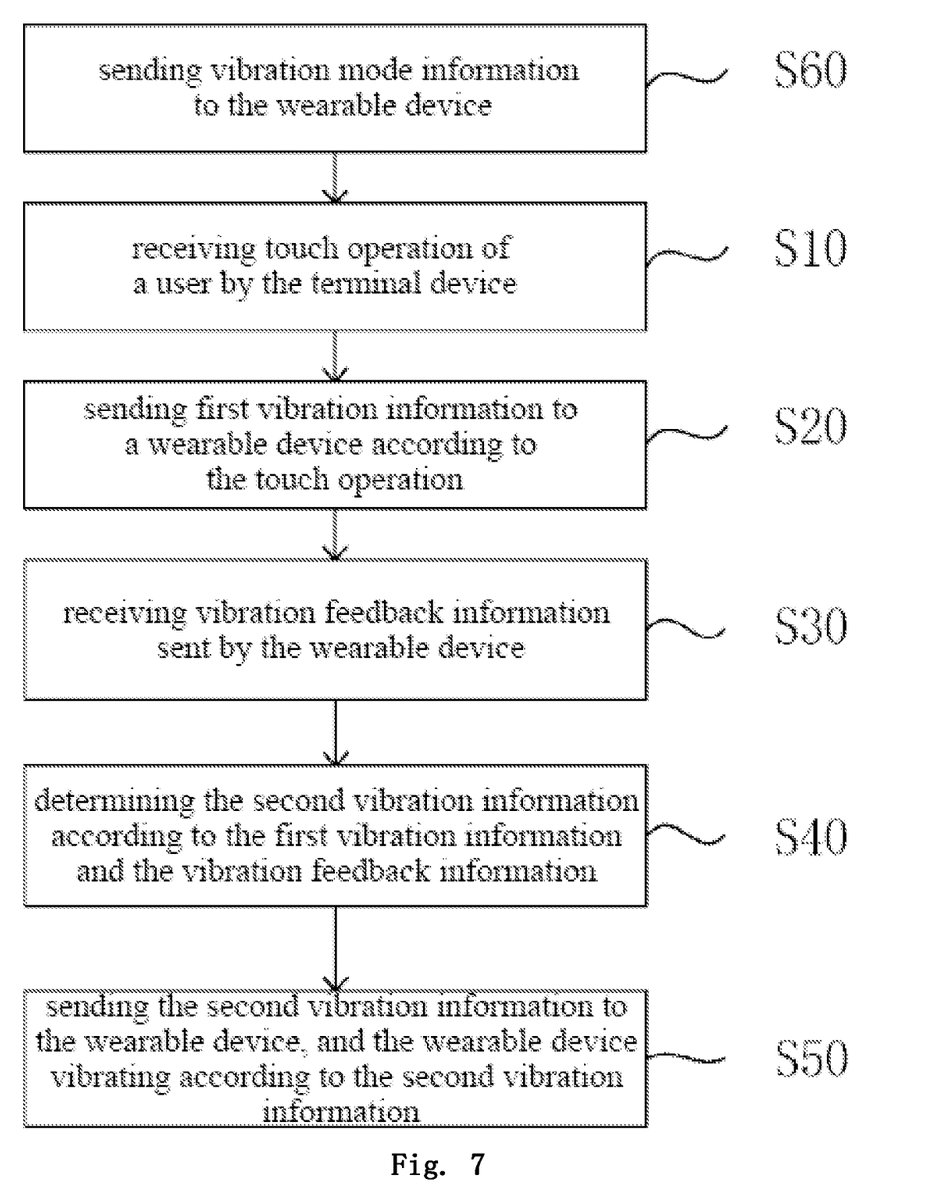
FIG. 7 is a flowchart of a sixth embodiment of a step counting method of the present application.

With reference to FIG. 7, the haptic feedback method in Embodiment 5 also includes:

S60, sending vibration mode information to the wearable device, wherein when the vibration mode information is a first vibration mode, the wearable device vibrates according to the second vibration information, and when the vibration mode information is a second vibration mode, the wearable device vibrates according to the first vibration information.

Here, the vibration mode information is used to indicate the vibration performance of the terminal device, the vibration mode information includes a first vibration mode and a second vibration mode, the first vibration mode is used to indicate that the terminal device supports vibration, and the second vibration mode is used to indicate that the terminal device does not support vibration. Therefore, after sending the vibration mode information to the wearable device by the terminal device, the wearable device may select, according to the vibration mode information, whether to vibrate according to the first vibration information or to determine the vibration feedback information according to the first vibration information.

In an optional embodiment, the vibration mode information includes device information of the terminal device. Here, the terminal device sends vibration mode information to the wearable device, and the vibration mode information includes device information of the terminal device. Specifically, the device information includes hardware information of different hardwares in the terminal device. When the terminal device sends the device information to the wearable device, the wearable device searches the device information related to the vibration from the device information. When the device information associated with vibration is searched out by the wearable device, the wearable device determines that the terminal device supports vibration, and determines the vibration feedback information according to the first vibration information received by the wearable device. When the device information associated with vibration is not searched out by the wearable device, the wearable device determines that the terminal device does not support vibration, and the wearable device vibrates directly according to the received first vibration information.

In order to achieve the above object, the present application provides a wearable device, which includes a memory, a processor, and a haptic feedback program stored on the memory and operable on the processor, the haptic feedback program, when executed by the processor, implementing the haptic feedback method according to any one of the above embodiments.

In order to achieve the above object, the present application provides a terminal device, which includes a memory, a processor and a haptic feedback program stored on the memory and operable on the processor, the haptic feedback program, when executed by the processor, implementing the haptic feedback method according to any one of the above embodiments.

In order to achieve the above object, the present application provides a computer readable storage medium having a haptic feedback program stored thereon the haptic feedback program, when executed by the processor, implementing the haptic feedback method according to any one of the above embodiments.

In this description, the embodiments are described in a parallel manner or in a progressive manner. Each embodiment focuses on the difference with other embodiments. The same or similar parts of the embodiments may be referred to each other. For the device disclosed by the embodiment, since it corresponds to the method disclosed by the embodiment, the description is relatively simple, and the related part may be referred to the description of the method section.

Those skilled in the art may also understand that the units and algorithm steps of embodiments described in combination with the embodiments disclosed herein may be implemented in electronic hardware, computer software or a combination thereof. In order to clearly explain the interchangeability of hardware and software, the composition and steps of embodiments have been generally described in the above description according to their functions. Whether these functions are performed in hardware or software depends on the specific application and design constraints of the technical solution. Professionals and technicians may use different methods to implement the described functions for each specific application, but such implementation should not be considered beyond the scope of the present application.

The steps of the method or algorithm described in combination with the embodiments disclosed herein may be directly implemented with hardware, software module executed by the processor or a combination thereof. The software module may be located in a random access memory (RAM), a memory, a read-only memory (ROM), an electrically programmable ROM, an electrically erasable programmable ROM, a register, a hard disk, a removable disk, a CD-ROM, or any other form of storage medium known in the technical field.

It should also be noted that, in this description, relational terms such as first and second are only used to distinguish one entity or operation from another entity or operation, and do not necessarily require or imply any such actual relationship or order between these entities or operations. Moreover, the terms of "comprise", "include" or any other variant thereof are intended to cover non-exclusive inclusion, so that a process, a method, an article or a device including a series of elements not only includes those elements, but also includes other elements not explicitly listed, or also includes elements inherent to such process, method, article or device. Without further restrictions, the elements defined by the statement "including a . . . " do not exclude that there are other identical elements in the process, method, article or device including the elements.

What is claimed is:

1. A haptic feedback method, the haptic feedback method being applied to a wearable device, and the haptic feedback method comprising:
   receiving, by the wearable device, first vibration information sent by a terminal device, the first vibration information includes at least one of vibration time, vibration frequency, or vibration duration;
   sending vibration feedback information to the terminal device according to the first vibration information, the vibration feedback information includes at least one of vibration position information or vibration time information;
   receiving second vibration information sent by the terminal device, the second vibration information includes at least one of vibration amplitude, vibration duration, vibration delay, or vibration frequency; and
   vibrating according to the second vibration information.

2. The haptic feedback method according to claim 1, wherein the haptic feedback method further comprises: after receiving, by the wearable device, the first vibration information sent by the terminal device,
   obtaining vibration mode information of the terminal device; and
   if the vibration mode information of the terminal device is a first vibration mode, sending vibration feedback information to the terminal device according to the first vibration information.

3. The haptic feedback method according to claim 2, wherein the haptic feedback method further comprises: after obtaining the vibration mode information of the terminal device,
   if the vibration mode information of the terminal device is a second vibration mode, vibrating according to the first vibration information.

4. The haptic feedback method according to claim 2, wherein obtaining the vibration mode information of the terminal device comprises:
   obtaining device information of the terminal device; and
   determining the vibration mode information of the wearable device according to the device information.

5. A computer readable storage medium having a haptic feedback program stored thereon, the haptic feedback program, when executed by a processor, implementing the haptic feedback method according to claim 1.

6. A haptic feedback method, the haptic feedback method being applied to a terminal device and the haptic feedback method comprising:
   receiving, by the terminal device, touch operation of a user;
   sending first vibration information to a wearable device according to the touch operation, the first vibration information includes at least one of vibration time, vibration frequency, or vibration duration;
   obtaining vibration feedback information sent by the wearable device, the vibration feedback information includes at least one of vibration position information or vibration time information;
   determining second vibration information according to the first vibration information and the vibration feedback information, the second vibration information includes at least one of vibration amplitude, vibration duration, vibration delay, or vibration frequency; and
   sending the second vibration information to the wearable device, so that the wearable device vibrates according to the second vibration information.

7. The haptic feedback method according to claim 6, wherein the haptic feedback method further comprises:
   sending vibration mode information to the wearable device,
   wherein when the vibration mode information is a first vibration mode, the wearable device vibrates according to the second vibration information, and
   when the vibration mode information is a second vibration mode, the wearable device vibrates according to the first vibration information.

8. The haptic feedback method according to claim 7, wherein the vibration mode information comprises device information of the terminal device.

9. A wearable device, comprising a memory, a processor, and a haptic feedback program stored on the memory and operable by the processor, the haptic feedback program, when executed by the processor, implementing the haptic feedback method according to claim 6.

10. A terminal device, comprising a memory, a processor and a haptic feedback program stored on the memory and operable by the processor, the haptic feedback program, when executed by the processor, implementing the haptic feedback method according to claim 6.

\* \* \* \* \*